(12) United States Patent
Cohen et al.

(10) Patent No.: US 8,352,683 B2
(45) Date of Patent: Jan. 8, 2013

(54) METHOD AND SYSTEM TO REDUCE THE POWER CONSUMPTION OF A MEMORY DEVICE

(75) Inventors: Ehud Cohen, Kiryat (IL); Oleg Margulis, Haifa (IL); Raanan Sade, Kibutz Gvat (IL); Stanislav Shwartsman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 12/823,047

(22) Filed: Jun. 24, 2010

(65) Prior Publication Data

US 2011/0320723 A1 Dec. 29, 2011

(51) Int. Cl.
*G06F 12/00* (2006.01)
*G06F 13/00* (2006.01)
*G06F 13/28* (2006.01)
*G06F 1/00* (2006.01)

(52) U.S. Cl. ........................ 711/128; 713/324
(58) Field of Classification Search .................. 711/128; 713/324

See application file for complete search history.

(56) References Cited

U.S. PATENT DOCUMENTS

| | | | |
|---|---|---|---|
| 2002/0133672 | A1 | 9/2002 | Van De Waerdt et al. |
| 2007/0043965 | A1 | 2/2007 | Mandelblat et al. |
| 2007/0113013 | A1* | 5/2007 | Knoth ........................ 711/128 |
| 2007/0260818 | A1 | 11/2007 | Damaraju et al. |
| 2010/0146212 | A1 | 6/2010 | Cohen et al. |

OTHER PUBLICATIONS

Atoofian, Ehsan, A Power-Aware Prediction-Based Cache Coherence Protocol for Chip Multiporcessors, 2007, IEEE.*
International Search Report and Written Opinion for PCT Patent Application No. PCT/US2011/041527 Mailed Feb. 9, 2012, 9 Pages.

* cited by examiner

*Primary Examiner* — Jared Rutz
*Assistant Examiner* — Ryan Bertram
(74) *Attorney, Agent, or Firm* — Blakely, Sokoloff, Taylor & Zafman LLP

(57) ABSTRACT

A method and system to reduce the power consumption of a memory device. In one embodiment of the invention, the memory device is a N-way set-associative level one (L1) cache memory and there is logic coupled with the data cache memory to facilitate access to only part of the N-ways of the N-way set-associative L1 cache memory in response to a load instruction or a store instruction. By reducing the number of ways to access the N-way set-associative L1 cache memory for each load or store request, the power requirements of the N-way set-associative L1 cache memory is reduced in one embodiment of the invention. In one embodiment of the invention, when a prediction is made that the accesses to cache memory only requires the data arrays of the N-way set-associative L1 cache memory, the access to the fill buffers are deactivated or disabled.

16 Claims, 5 Drawing Sheets

METHOD AND SYSTEM TO REDUCE THE POWER CONSUMPTION OF A MEMORY DEVICE

FIELD OF THE INVENTION

This invention relates to a memory device, and more specifically but not exclusively, to a method and system to reduce the power consumption of the memory device.

BACKGROUND DESCRIPTION

A memory device such as a cache memory allows a processor to execute instructions faster by storing the most recently used copies of the main memory in the cache lines of the cache memory. The access latency of a program can be reduced if its required instructions or data are stored in the cache lines of the cache memory.

A non-blocking cache memory is used in an out-of-order micro-architecture to avoid stalling of the processor when a cache memory miss event occurs. Dedicated hardware such as fill buffers allows latter load and store requests to be served even if there is a cache memory miss event. The fill buffers may contain a copy of a cache line in any state and are accessed whenever the data cache is accessed during the execution of a load or store request. A memory line of the main memory may be located either in the fill buffers or in the data cache but not simultaneously in both.

The level one cache memory is frequently accessed by the processor and its size and set-associative configuration can affect the performance of the processor. For example, a level one cache memory can have a size of 32 kilobytes, a 8 way set associative configuration and can hold 64 bytes per cache memory line. To access the level one cache memory for a load request, all the 8 ways of a set of the cache memory must be read to determine which way to get the required data.

BRIEF DESCRIPTION OF THE DRAWINGS

The features and advantages of embodiments of the invention will become apparent from the following detailed description of the subject matter in which.

DETAILED DESCRIPTION

Figure 1:
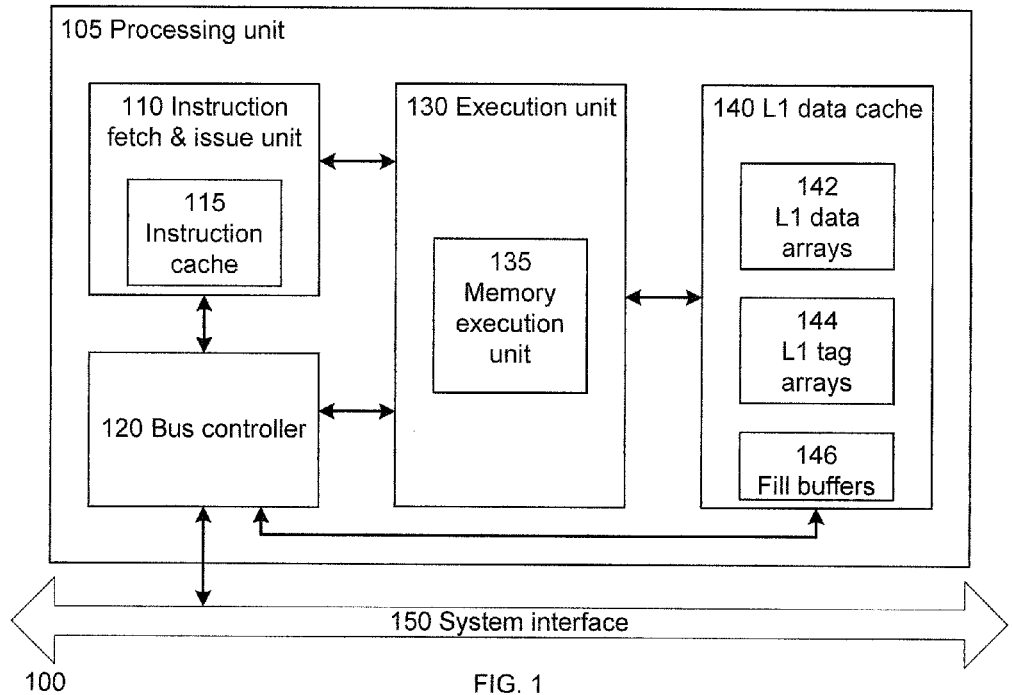
FIG. 1 illustrates a block diagram of a processing unit in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system to reduce the power consumption of a memory device. In one embodiment of the invention, the memory device is a N-way set-associative level one (L1) cache memory, where N is an integer and has a value greater than one. There is logic coupled with the data cache memory to facilitate access to only part of the N-ways of the N-way set-associative L1 cache memory in response to a load instruction or a store instruction. By reducing the number of ways to access the N-way set-associative L1 cache memory for each load or store request, the power requirements of the N-way set-associative L1 cache memory is reduced in one embodiment of the invention.

For example, in one embodiment of the invention, the memory device is a 8-way set-associative L1 cache memory and it is partitioned into two groups of arrays where each array has four ways of access. When a load or store instruction is received, only one of the two groups of arrays is selected, i.e., only 4 out of the 8 ways of the 8-way set-associative L1 cache memory are accessed. In one embodiment of the invention, the selection between the two groups of arrays is based on an address bit of a virtual address of the 8-way set-associative L1 cache memory.

In one embodiment of the invention, the N-way set-associative L1 cache memory has one or more fill buffers to allow out-of-order instructions to be executed on a processor, i.e., the N-way set-associative L1 cache memory is a non-blocking cache memory. In one embodiment of the invention, the access to the fill buffers are deactivated or disabled when a prediction is made that the accesses to the cache memory only requires the data arrays of the N-way set-associative L1 cache memory. The power consumption of the N-way set-associative L1 cache memory is reduced as the logic associated with the fill buffers are deactivated in one embodiment of the invention. The memory device includes, but is not limited to, a cache memory, a cache data array, a cache tag array and the like.

FIG. 1 illustrates a block diagram 100 of a processing unit 105 in accordance with one embodiment of the invention. The processing unit 105 has a instruction fetch and issue unit 110, a bus controller 120, an execution unit 130 and a L1 data cache memory 140 in one embodiment of the invention.

The bus controller 120 of the processing unit 105 is coupled with a system interface 150 to connect to other components including, but not limited to, a main memory, a level two cache memory, a chipset and the like. The instruction fetch and issue unit 110 fetches instructions from an external memory or main memory through the bus controller 120 via the system interface 150, or any other external bus. The fetched instructions are stored in the instruction cache memory 115. In one embodiment of the invention, the bus controller 120 manages cache coherency transfers in the processing unit 105.

The execution unit 130 receives and executes the fetched instructions from the instruction fetch and issue unit 110 and performs arithmetic and logic operations, including but not limited to, add, subtract, logical AND, integer multiply, memory operations and the like. In one embodiment of the invention, the execution unit 130 has a memory execution unit 135 to execute memory access operations including but not limited to, load and store operations in the processing unit 105. The memory execution unit 135 receives load and store operations from a scheduler and executes them to complete the memory access operations.

The memory execution unit 135 is coupled with a L1 data cache memory 140 that has L1 data arrays 142, L1 tag arrays 144 and fill buffers 146 in one embodiment of the invention. The L1 data cache memory 140 has other components such as a translation lookaside buffer (TLB) that is not shown in FIG. 1 for clarity of illustration. In one embodiment of the invention, the L1 data cache memory 140 has logic to control the access of the fill buffers 146 and restrict the memory access operations to only parts of the cache ways of the L1 data arrays 142 and the L1 tag arrays 144.

Figure 2:
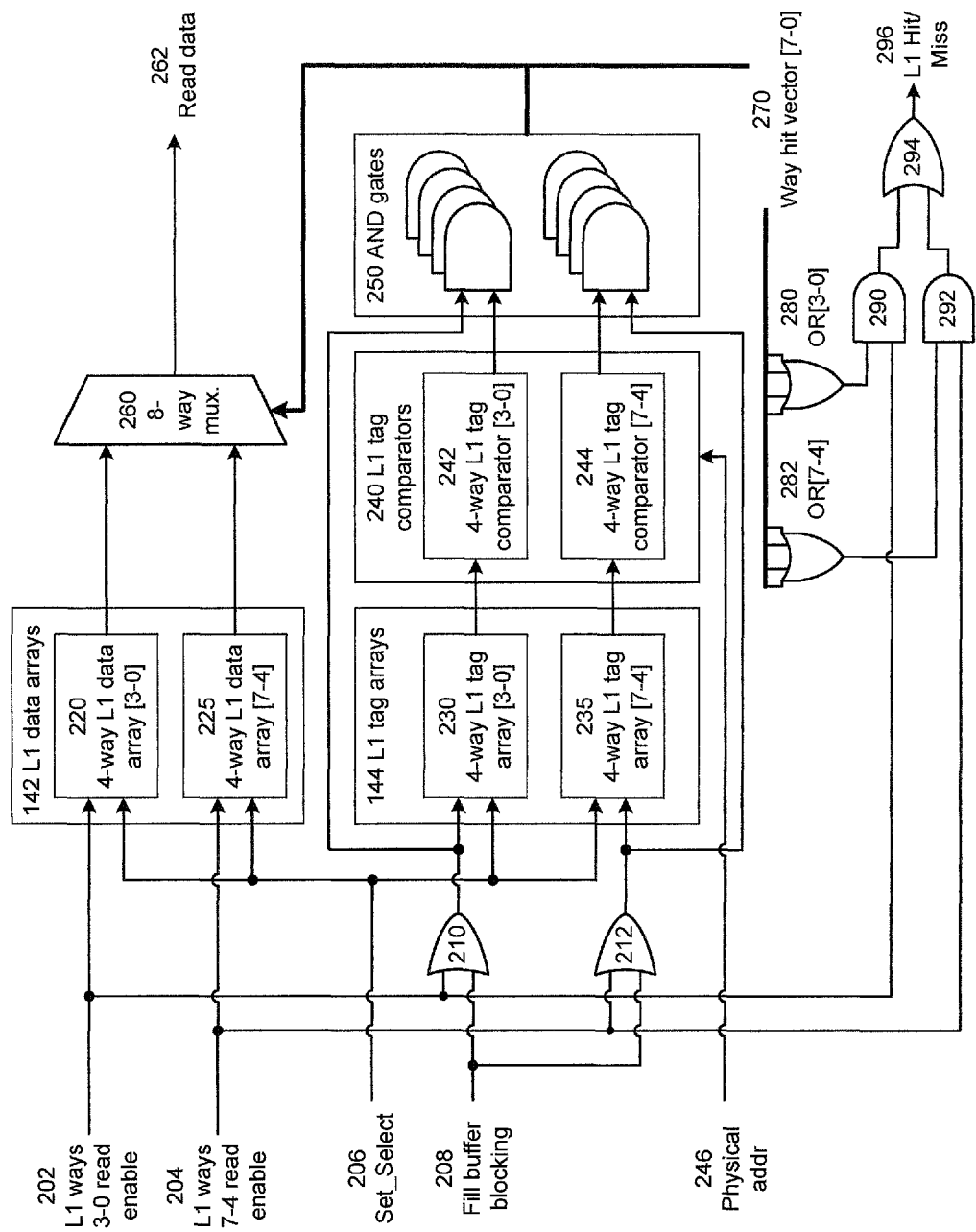
FIG. 2 illustrates a block diagram of a memory execution unit and a level one data cache memory in accordance with one embodiment of the invention.

FIG. 2 illustrates a block diagram 200 of the memory execution unit 135 and the L1 data cache memory 140 in accordance with one embodiment of the invention. For clarity of illustration, FIG. 2 is discussed with reference to FIG. 1. In one embodiment of the invention, the L1 data cache memory 140 is a 8-way set-associative L1 cache memory. The L1 data arrays 142 and the L1 tag arrays 144 in the L1 data cache memory 140 are divided into two parts or groups in one embodiment of the invention. The L1 data arrays 142 are partitioned into the 4-way L1 data array [3-0] 220 and the 4-way L1 data array [7-4] 225.

The L1 ways 3-0 read enable signal 202 and the L1 ways 7-4 read enable signal 204 control the access or activation of the 4-way L1 data array [3-0] 220 and the 4-way L1 data array [7-4] 225 respectively. For example, in one embodiment of the invention, if only the 4-way L1 data array [3-0] 220 is allowed or required to be accessed, the L1 ways 3-0 read enable signal 202 is asserted to enable the 4-way L1 data array [3-0] 220 and the L1 ways 7-4 read enable signal 204 is de-asserted to disable the 4-way L1 data array [7-4] 225.

The set_select signal 206 is coupled with the 4-way L1 data array [3-0] 220 and the 4-way L1 data array [7-4] 225 to select the desired or required set to be accessed. For example, in one embodiment of the invention, the L1 data cache memory 140 is a cache memory with 32 kilobytes, 64 sets and each set has 8 ways of cache access. To perform a load or a store instruction, the desired set is selected using the set_select signal 206 and the 8-way multiplexer (mux) 260 selects which way of the desired set as the read data 262.

The control signal of the 8-way mux 260 is generated by a way hit vector [7-0] 270. The way hit vector [7-0] 270 has eight bits to represent which of the 8 ways of the L1 data cache memory 140 is to be selected as the read data 262 in one embodiment of the invention. The way hit vector [7-0] 270 is generated from the L1 tag arrays 144, the L1 tag comparators 240 and the AND gates block 250 in one embodiment of the invention. The L1 tag arrays 144 are partitioned into the 4-way L1 tag array [3-0] 230 and the 4-way L1 tag array [7-4] 235.

The set_select signal 206 is coupled with the 4-way L1 tag array [3-0] 230 and the 4-way L1 tag array [7-4] 235 to select the desired or required set to be accessed. The 4-way L1 tag array [3-0] 230 and the 4-way L1 tag array [7-4] 235 are coupled with the 4-way L1 tag comparator [3-0] 242 and the 4-way L1 tag comparator [7-4] 244 in the L1 tag comparators 240 respectively. The L1 tag comparators 240 compare the tag address in the ways of the selected set of the 4-way L1 tag array [3-0] 230 and the 4-way L1 tag array [7-4] 235 with a physical address 246 of the load or store instruction. If a match is found, the respective tag comparator in the L1 tag comparators 240 generates a logic one signal to the AND gates block 250. If no match is found, the respective tag comparator in the L1 tag comparators 240 generates a logic zero signal to the AND gates block 250.

The 4-way L1 tag comparator [3-0] 242 generates a signal for each way 3-0 and each signal is coupled to a respective AND gate in the AND gates block 250. Similarly, the 4-way L1 tag comparator [7-4] 244 generates a signal for each way 7-4 and each signal is coupled to a respective AND gate in the AND gates block 250. Each AND gate coupled with the 4-way L1 tag comparator [3-0] 242 is coupled with the output of a OR gate 210. The output of the OR gate 210 is driven by a fill buffer blocking signal 208 and the L1 ways 3-0 read enable signal 202. Similarly, each AND gate coupled with the 4-way L1 tag comparator [7-4] 244 is coupled with the output of a OR gate 212. The output of the OR gate 212 is driven by the fill buffer blocking signal 208 and the L1 ways 7-4 read enable signal 204.

The fill buffer blocking signal 208 selects whether the control of the L1 tag arrays 144 is to be determined by the L1 ways 3-0 read enable signal 202 and the L1 ways 7-4 read enable signal 204. The output of the OR gates 210 and 212 are coupled with the 4-way L1 tag array [3-0] 230 and the 4-way L1 tag array [7-4] 235 respectively to enable or disable their operation. For example, in one embodiment of the invention, when the fill buffer blocking signal 208 is asserted or set to logic one, the output of the OR gates 210 and 212 are asserted to logic one to enable both the 4-way L1 tag array [3-0] 230 and the 4-way L1 tag array [7-4] 235.

When the fill buffer blocking signal 208 is set at logic one, the L1 ways 3-0 read enable signal 202 and the L1 ways 7-4 read enable signal 204 do not affect the operation of the 4-way L1 tag array [3-0] 230 and the 4-way L1 tag array [7-4] 235 since the output of the OR gates 210 and 212 are set to logic one by the fill buffer blocking signal 208. Similarly, the AND gates in the AND gates block 250 are not affected by the L1 ways 3-0 read enable signal 202 and the L1 ways 7-4 read enable signal 204 when the fill buffer blocking signal 208 is set to logic one.

When the fill buffer blocking signal 208 is de-asserted or set to logic zero, the control of the 4-way L1 tag array [3-0] 230 and the 4-way L1 tag array [7-4] 235 is determined by the L1 ways 3-0 read enable signal 202 and the L1 ways 7-4 read enable signal 204 respectively. This is because the output of the OR gates 210 and 212 are dependent only on the state of the 4-way L1 tag array [3-0] 230 and the 4-way L1 tag array [7-4] 235 when the fill buffer blocking signal 208 is set to logic zero.

For example, in one embodiment of the invention, when the ways 3-0 are to be enabled and the ways 7-4 are to be disabled, the L1 ways 3-0 read enable signal 202 and the L1 ways 7-4 read enable signal 204 are set to logic one and zero respectively. The 4-way L1 data array [3-0] 220 is activated by the L1 ways 3-0 read enable signal 202. The L1 ways 3-0 read enable signal 202 sets the output of the OR gate 210 to logic one and the 4-way L1 tag array [3-0] 230 is enabled. The AND gates coupled to the 4-way L1 tag comparator [3-0] 242 are enabled as the output of the OR gate 210 to logic one.

As the L1 ways 7-4 read enable signal 204 is set to logic zero, the 4-way L1 data array [7-4] 225 is disabled. The output of the OR gate 212 is set to logic zero as both the L1 ways 7-4 read enable signal 204 and the fill buffer blocking signal 208 are set to logic zero. Since the output of the OR gate 212 is set to logic zero, the 4-way L1 tag array [7-4] 235 is disabled and the AND gates coupled to the 4-way L1 tag comparator [7-4] 244 are disabled.

The way hit vector [7-0] 270 is coupled with a OR gate [3-0] 280 and a OR gate [7-4] 282. The four inputs of the OR gate [3-0] 280 are coupled to the ways 3-0 of the way hit vector [7-0] 270. Similarly, the four inputs of the OR gate [7-4] 282 are coupled to the ways 7-4 of the way hit vector [7-0] 270. The AND gate 290 is coupled to the output of the OR gate [3-0] 280 and the L1 ways 3-0 read enable signal 202. The AND gate 292 is coupled to the output of the OR gate [7-4] 282 and the L1 ways 7-4 read enable signal 204. Both the output of the AND gates 290 and 292 are coupled with a OR gate 294 to generate the L1 cache hit/miss signal 296. The L1 cache hit/miss signal 296 indicates whether there is a cache memory hit or miss of the L1 data cache memory 140.

In one embodiment of the invention, the L1 data arrays 142 and the L1 tag arrays 144 in the L1 data cache memory 140 maintain the performance of the processing unit 105 while reducing the power consumption as the number of ways of cache access is reduced. The illustration of the L1 data cache memory 140 in FIG. 2 is not meant to be limiting. In other embodiments of the invention, a different structure and configuration of the data and tag arrays can be used without affecting the workings of the invention.

For example, in another embodiment of the invention, each of the data and the tag arrays is divided into more than two partitions and separate control signals can be generated to select which partition or group of the data and tag arrays are to be selected for a load or store operation. One of ordinary skill in the relevant art will readily appreciate how to modify the logic to support a different configuration of the L1 data cache memory 140 and it will not be described herein.

Figure 3:
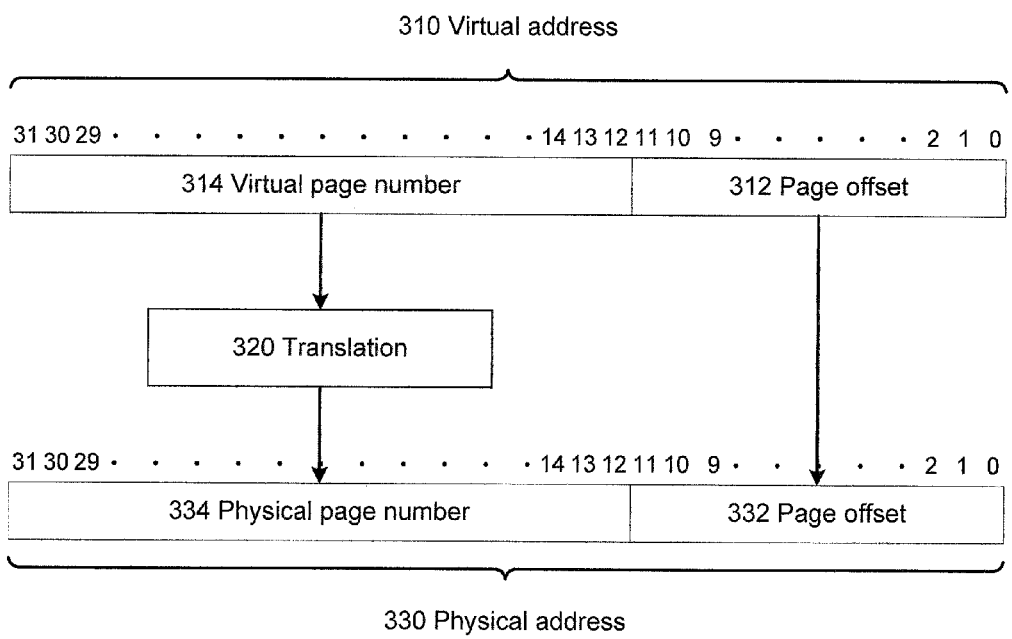
FIG. 3 illustrates a mapping of a virtual address to a physical address in accordance with one embodiment of the invention.

FIG. 3 illustrates a mapping 300 of a virtual address 310 to a physical address 330 in accordance with one embodiment of the invention. The virtual or linear address 310 has a page offset 312 and a virtual page number 314 in one embodiment of the invention. The page offset 312 is made up of the first twelve address bits [11:0] of the virtual address 310 and is not translated when the virtual address 310 is translated to the physical address 330.

In one embodiment of the invention, the six address bits [11:6] of the virtual address 310 is used as a set address. With six address bits, 64 sets can be selected. In one embodiment of the invention, the set_select signal 206 is generated based on the address bits [11:6] of the virtual address 310. The virtual page number 314 is translated via the translation logic 320 to obtain the physical page number 334 in one embodiment of the invention. The translation logic 320 includes, but is not limited to, a look-up table in a TLB. In one embodiment of the invention, the L1 ways 3-0 read enable signal 202 and the L1 ways 7-4 read enable signal 204 are generated based on the address bit [12] of the virtual address 310. For example, in one embodiment of the invention, when the address bit [12] is asserted, the L1 ways 3-0 read enable signal 202 and the L1 ways 7-4 read enable signal 204 are asserted and de-asserted respectively. When the address bit [12] is de-asserted, the L1 ways 3-0 read enable signal 202 and the L1 ways 7-4 read enable signal 204 are de-asserted and asserted respectively.

The address bit [12] is set prior to any cache memory access to determine which 4 ways of the L1 data cache memory 140 is to be accessed. One of ordinary skill in the relevant will readily appreciate that other ways of generating the L1 ways 3-0 read enable signal 202 and the L1 ways 7-4 read enable signal 204 can be used without affecting the workings of the invention and these other ways shall not be described herein. In one embodiment of the invention, another bit or bits of the virtual address 310 can be used to generate the L1 ways 3-0 read enable signal 202 and the L1 ways 7-4 read enable signal 204. In another embodiment of the invention, another bit or bits of another register can be used to generate the L1 ways 3-0 read enable signal 202 and the L1 ways 7-4 read enable signal 204. The virtual address 310 and the physical address 330 can have more than 32 bits in another embodiment of the invention.

Figure 4:
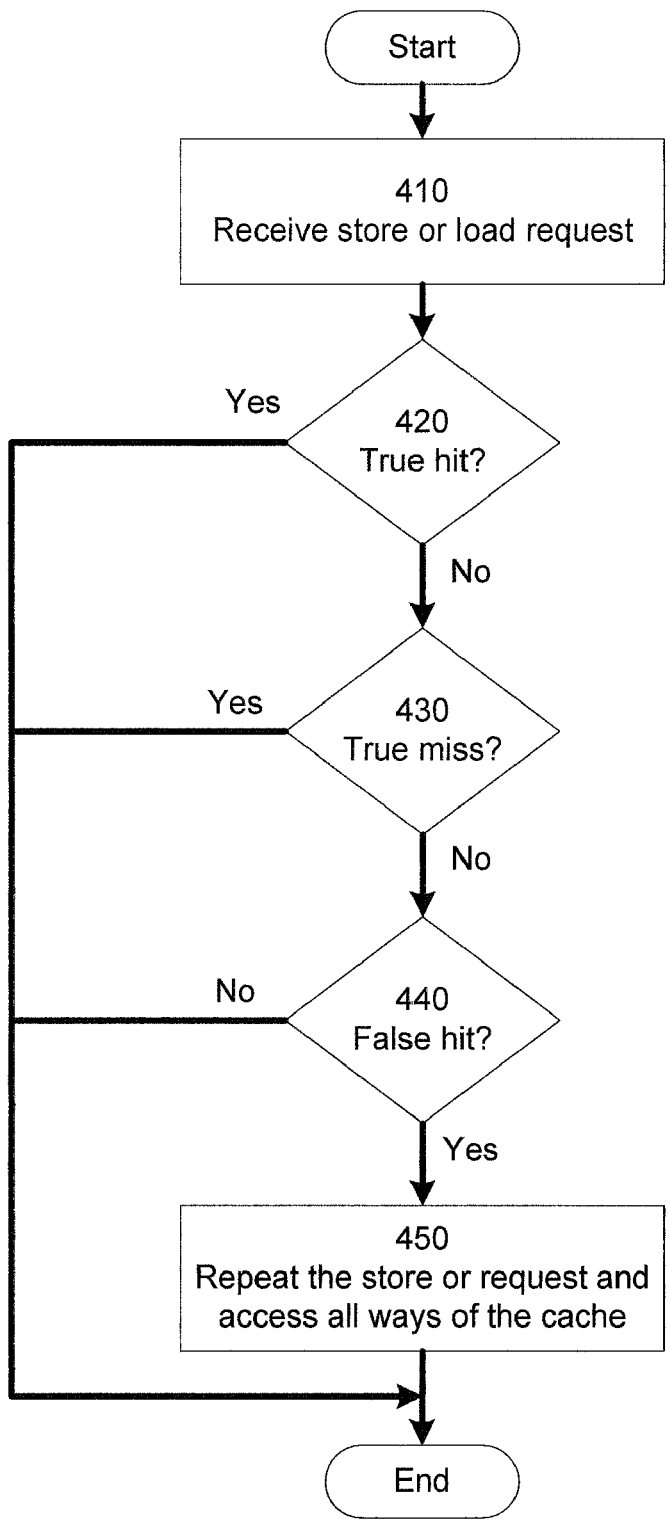
FIG. 4 illustrates a flow chart to handle an aliasing event in accordance with one embodiment of the invention.

FIG. 4 illustrates a flow chart 400 to handle an aliasing event in accordance with one embodiment of the invention. In a virtually indexed cache memory, the number of bits used to locate a particular cache memory line is larger than the page size and one or more bits may be aliased. For example, in one embodiment of the invention, the same physical page can be referenced in two different locations in the cache memory based on the value of the aliased bit. As such, two different cache memory lines in the L1 data cache memory 140 may hold different versions of the same physical memory.

The flow 400 illustrates a method to handle an aliasing event in accordance with one embodiment of the invention. In step 410, the flow receives a store or a load request. In step 420, the flow checks if there is a true hit event of the store or load request in the L1 data cache memory 140. In one embodiment of the invention, a true hit event occurs when the memory location of the store or load request is cached in one of the selected 4 ways of the L1 data cache memory 140.

For example, in one embodiment of the invention, the processing unit 105 receives a store request at virtual address X. The memory execution unit 135 checks the address bit [12] of the virtual address X to determine whether ways 3-0 or ways 7-4 of the L1 data cache memory 140 are to be accessed. Assuming that ways 3-0 are selected by the address bit [12], the L1 tag comparators [3-0] 242 generates a L1 hit signal, i.e., true hit, when one of the tag arrays in the 4-way L1 tag array [3-0] 242 matches the virtual address X.

If there is a true hit event in step 420, the flow 400 ends. If there is no true hit event in step 420, the flow 400 goes to step 430 to check if there is a true miss event of the store or load request in the L1 data cache memory 140. In one embodiment of the invention, a true miss event occurs when the memory location of the store or load request is not cached in all the 8 ways of the L1 data cache memory 140.

For example, in one embodiment of the invention, the processing unit 105 receives a load request at virtual address Y. The memory execution unit 135 checks the address bit [12] of the virtual address Y to determine whether ways 3-0 or ways 7-4 of the L1 data cache memory 140 are to be accessed. The L1 tag comparators 240 generates a L1 miss signal, i.e., true miss, when none of the tag arrays in either the 4-way L1 tag array [3-0] 242 or the 4-way L1 tag array [7-4] 244 matches the virtual address Y.

If there is a true miss event in step 430, the flow 400 ends. If there is no true miss event in step 430, the flow 400 goes to step 440 to check if there is a false hit event of the store or load request in the L1 data cache memory 140. In one embodiment of the invention, a false hit event occurs when the L1 tag comparators 240 generate a hit but the address bit [12] selects the incorrect group of data arrays.

For example, in one embodiment of the invention, the processing unit 105 receives a load request at virtual address Z. The memory execution unit 135 checks the address bit [12] of the virtual address Z to determine whether ways 3-0 or ways 7-4 of the L1 data cache memory 140 are to be accessed. Assuming that ways 3-0 are selected by the address bit [12], the 4-way L1 data array [3-0] 220 is selected. However, due to aliasing, a hit signal, i.e., false hit, is generated by the 4-way L1 tag comparator [7-4] 244 instead of the 4-way L1 tag comparator [3-0] 242 when the L1 tag comparator 240 compares the physical address of the load request.

If there is no false hit event in step 440, the flow 400 ends. If there is a false hit event in step 440, the flow 400 goes to step 450 to repeat the store or load request and enables or activates all ways of the L1 data arrays 142 and the flow ends.

Figure 5:
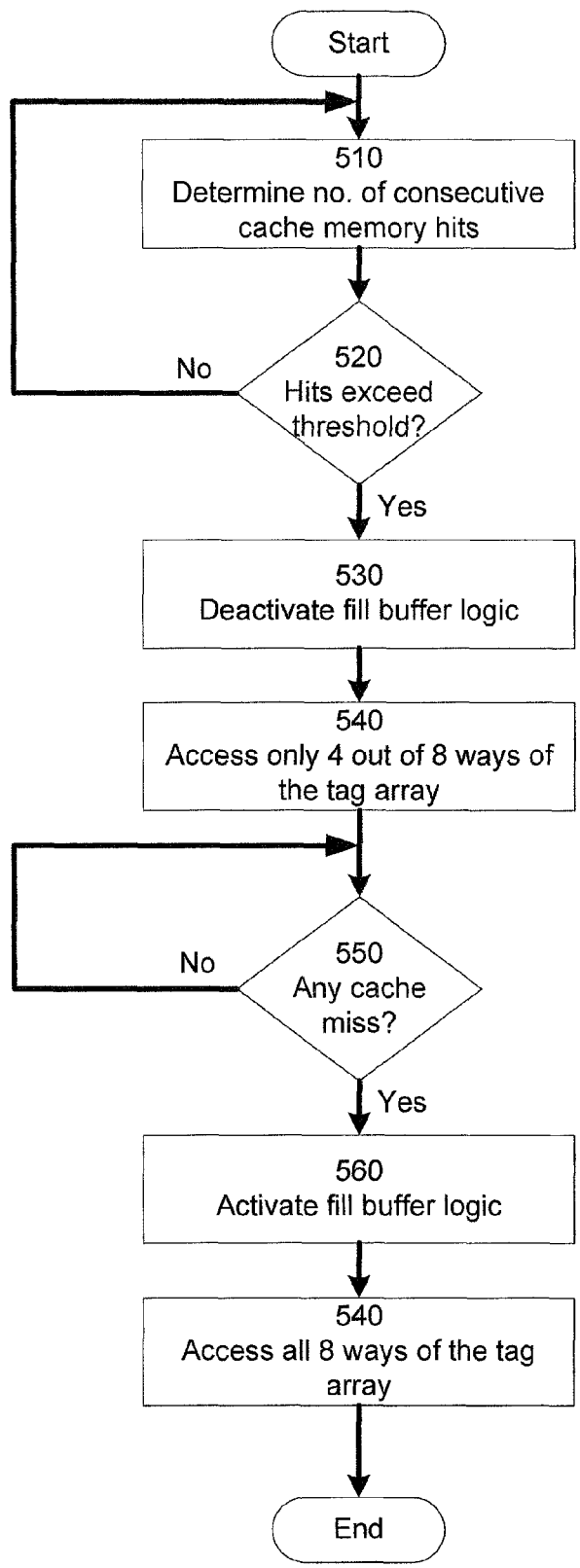
FIG. 5 illustrates a flow chart to reduce the power consumption of a cache memory in accordance with one embodiment of the invention.

FIG. 5 illustrates a flow chart 500 to reduce the power consumption of a cache memory in accordance with one embodiment of the invention. For clarity of illustration, FIG. 5 is discussed with reference to FIG. 2.

In step 510, the flow 500 determines the number of consecutive cache memory hits of the L1 data cache memory 140. In one embodiment of the invention, the processing unit 105 comprises logic to predict the number of consecutive cache memory hits. In another embodiment of the invention, the step 510 determines the number of consecutive clocks of cache memory hits of the L1 data cache memory 140.

In step 520, the flow 500 checks if the number of hits or number of clock cycles of hits exceeds a threshold. In one embodiment of the invention, the threshold is set to 128 clocks of cache hits in the L1 data cache memory 140. If no, the flow 500 goes back to step 510. If yes, the flow 500 goes to step 530 to deactivate the logic associated with the fill buffers 146 in one embodiment of the invention. In another embodiment of the invention, step 530 restricts the access to the fill buffers 146. In one embodiment of the invention, the input clock(s) of the logic associated with the fill buffers 146 is stopped or disabled when the logic associated with the fill buffers 146 is deactivated.

In one embodiment of the invention, the fill buffers 146 and the L1 data cache memory 140 do not keep or store the same cache line simultaneously, i.e., either the fill buffers 146 or the L1 data cache memory 140 is accessed for a load or a store operation. When the logic in the processing unit 105 predicts that there is a period of time where all load and store operations are hit or found in the L1 data cache memory 140, the fill buffer lookup is not needed as the required cache line is in the L1 data cache memory 140. The step 530 detects the inactivity of the filler buffers 146 and deactivates the logic associated with the fill buffers. The processing unit 105 on each memory access consumes low or minimal power when the logic associated with the fill buffers 146 is deactivated.

In step 540, the flow 500 reduces the number of access ways of the L1 tag arrays 144. For example, in one embodiment of the invention, only 4 out of the 8 ways of the L1 tag arrays 144 is accessed during a load or a store operation. In one embodiment of the invention, step 540 de-asserts the fill buffer blocking signal 208 to allow the L1 ways 3-0 read enable signal 202 and the L1 ways 7-4 read enable signal 204 to control the activation of the L1 tag arrays 144. In step 550, the flow 500 checks if there is any cache miss. If no, the flow 500 goes back to step 550.

If yes, the flow 500 goes to step 560 to activate the logic associated with the fill buffers 146. Step 560 detects the first cache memory miss of the L1 data cache memory 140 after the logic associated with the fill buffers 146 are deactivated. Although the first miss may incur a penalty to activate the logic associated with the fill buffers 146, the impact on the performance of the processing unit 105 is minimal as the fill buffers 146 are blocked after a long sequence of cache hits in the L1 data cache memory 140. In step 540, all the ways of the L1 tag arrays 144 are enabled for access and the flow ends. In one embodiment of the invention, the fill buffer blocking signal 208 is asserted to prevent the L1 ways 3-0 read enable signal 202 and the L1 ways 7-4 read enable signal 204 from controlling the activation of the L1 tag arrays 144 and all ways of the L1 tag arrays 144 are checked on every load or store operation.

Figure 6:
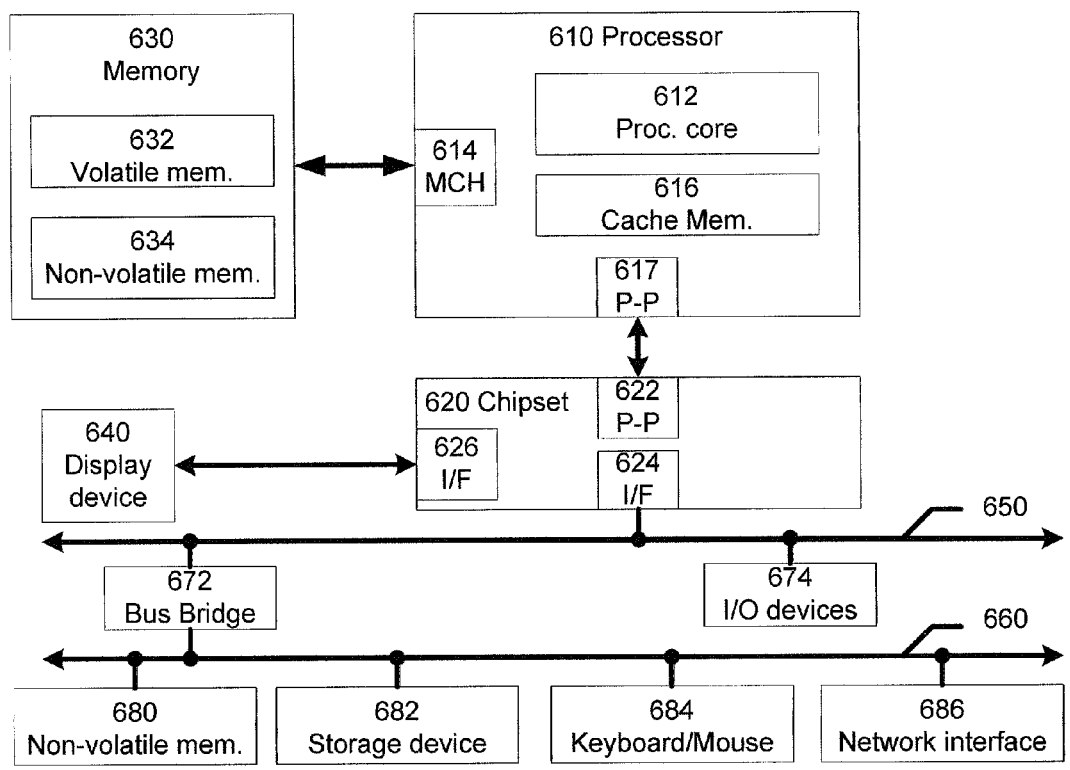
FIG. 6 illustrates a system to implement the methods disclosed herein in accordance with one embodiment of the invention.

FIG. 6 illustrates a system 600 to implement the methods disclosed herein in accordance with one embodiment of the invention. The system 600 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 600 used to implement the methods disclosed herein may be a system on a chip (SOC) system.

The processor 610 has a processing core 612 to execute instructions of the system 600. The processing core 612 includes, but is not limited to, pre-fetch logic to fetch instructions, decode logic to decode the instructions, execution logic to execute instructions and the like. The processor 610 has a cache memory 616 to cache instructions and/or data of the system 600. In another embodiment of the invention, the cache memory 616 includes, but is not limited to, level one, level two and level three, cache memory or any other configuration of the cache memory within the processor 610.

The memory control hub (MCH) 614 performs functions that enable the processor 610 to access and communicate with a memory 630 that includes a volatile memory 632 and/or a non-volatile memory 634. The volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 634 includes, but is not limited to, NAND flash memory, phase change memory (PCM), read only memory (ROM), electrically erasable programmable read only memory (EEPROM), or any other type of non-volatile memory device.

The memory 630 stores information and instructions to be executed by the processor 610. The memory 630 may also stores temporary variables or other intermediate information while the processor 610 is executing instructions. The chipset 620 connects with the processor 610 via Point-to-Point (PtP) interfaces 617 and 622. The chipset 620 enables the processor 610 to connect to other modules in the system 600. In one embodiment of the invention, the interfaces 617 and 622 operate in accordance with a PtP communication protocol such as the Intel® QuickPath Interconnect (QPI) or the like. The chipset 620 connects to a display device 640 that includes, but is not limited to, liquid crystal display (LCD), cathode ray tube (CRT) display, or any other form of visual display device.

In addition, the chipset 620 connects to one or more buses 650 and 655 that interconnect the various modules 674, 660, 662, 664, and 666. Buses 650 and 655 may be interconnected together via a bus bridge 672 if there is a mismatch in bus speed or communication protocol. The chipset 620 couples with, but is not limited to, a non-volatile memory 660, a mass storage device(s) 662, a keyboard/mouse 664 and a network interface 666. The mass storage device 662 includes, but is not limited to, a solid state drive, a hard disk drive, an universal serial bus flash memory drive, or any other form of computer data storage medium. The network interface 666 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 6 are depicted as separate blocks within the system 600, the functions performed by some of these blocks may be integrated within a single semiconductor circuit or may be implemented using two or more separate integrated circuits. For example, although the cache memory 616 is depicted as a separate block within the processor 610, the cache memory 616 can be incorporated into the processor core 612 respectively. The system 600 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
a data cache memory having a plurality of ways, wherein the data cache memory comprises a data array and a tag array; and
logic coupled with the data cache memory to:
facilitate access to only part of the plurality of ways of the data cache memory in response to a load instruction or a store instruction;
determine whether a number of consecutive cache memory hits of the data array exceeds a threshold;
facilitate access to only part of the plurality of ways of the tag array in response to a determination that the number of consecutive cache memory hits of the data array has exceeded the threshold;
determine whether a virtual address associated with the load instruction or the store instruction is to index a physical address that is mapped to another virtual address; and
facilitate access to all ways of the plurality of ways of the data cache memory in response to a determination that the virtual address associated with the load instruction or the store instruction is to index the physical address that is mapped to the another virtual address.

2. The apparatus of claim 1, wherein the logic to facilitate access to only part of the plurality of ways of the data cache memory is to facilitate access to only part of the plurality of ways of the data cache memory based at least in part on an address bit of the virtual address.

3. The apparatus of claim 1, further comprising one or more fill buffers, and wherein the logic is further to disable logic associated with the one or more fill buffers in response to the determination that the number of consecutive cache memory hits of the data array has exceeded the threshold.

4. The apparatus of claim 3, wherein the logic is further to:
determine whether there is a cache memory miss of the data array; and
enable the logic associated with the one or more fill buffers in response to a determination that there is a cache memory miss of the data array.

5. A system comprising:
a processor comprising:
a level one (L1) non-blocking cache memory having a plurality of ways, wherein the L1 non-blocking cache memory comprises a data array and a tag array; and
logic coupled to the L1 non-blocking cache memory to:
facilitate access to only part of the plurality of ways of the L1 non-blocking cache memory in response to a load instruction or a store instruction;
determine whether a number of consecutive cache memory hits of the data array exceeds a threshold;
facilitate access to only part of the plurality of ways of the tag array in response to a determination that the number of consecutive cache memory hits of the data array has exceeded the threshold;
determine whether a virtual address associated with the load instruction or the store instruction is to index a physical address that is mapped to another virtual address; and
facilitate access to all ways of the plurality of ways of the L1 non-blocking cache memory in response to a determination that the virtual address associated with the load instruction or the store instruction is to index the physical address that is mapped to the another virtual address.

6. The system of claim 5, wherein the logic is further to:
deactivate access to a plurality of fill buffers in response to the determination that the number of consecutive cache memory hits of the data array has exceeded the threshold;
determine whether there is a cache memory miss of the L1 non-blocking cache memory; and activate the access to the plurality of fill buffers in response to a determination that there is a cache memory miss of the L1 non-blocking cache memory.

7. The system of claim 5, wherein the L1 non-blocking cache memory is a N-way set associative cache memory, wherein the data array is a N-way data array, and wherein the N-way data array is partitioned into two or more groups, and wherein the logic to facilitate access to only part of the plurality of ways of the L1 non-blocking cache memory in response to the load instruction or the store instruction is to:
receive the load instruction or store instruction to access the N-way set associative cache memory; and
allow access to only one of the two or more groups of the N-way data array responsive to the received load instruction or store instruction.

8. The system of claim 7, wherein the logic to allow access to only one of the two or more groups of the N-way data array is to allow access to only one of the two or more groups of the N-way data array based at least in part on an address bit of the virtual address.

9. The system of claim 7, wherein each group of the N-way data array has an enable signal, and wherein the logic to allow access to only one of the two or more groups of the N-way data array is to allow access to only one of the two or more groups of the N-way data array based at least in part on each enable signal of each group of the N-way data array.

10. The system of claim 7, wherein the tag array is a N-way tag array, wherein the N-way tag array is partitioned into the two or more groups, and wherein the logic to facilitate access to only part of the plurality of ways of the tag array in response to the determination that the number of consecutive cache memory hits of the data array has exceeded the threshold is to:
allow access to only one of the two or more groups of the N-way tag array responsive to the received load instruction or store instruction.

11. The system of claim 5, wherein the processor is an out-of-order processor.

12. A method comprising:
facilitating access to only part of a plurality of ways of a data cache memory in response to a load instruction or a store instruction, wherein the data cache memory comprises a data array and a tag array;
determining whether a number of consecutive cache memory hits of the data array exceeds a threshold;
facilitating access to only part of a plurality of ways of the tag array in response to a determination that the number of consecutive cache memory hits of the data array has exceeded the threshold;
determining whether a virtual address associated with the load instruction or the store instruction is to index a physical address that is mapped to another virtual address; and
facilitating access to all ways of the plurality of ways of the data cache memory in response to a determination that the virtual address associated with the load instruction or the store instruction is to index the physical address that is mapped to the another virtual address.

13. The method of claim 12, further comprising deactivating access to a plurality of fill buffers in response to the determination that the number of consecutive cache memory hits of the data array has exceeded the threshold.

14. The method of claim 13, further comprising:
determining whether there is a cache memory miss of the data cache memory; and
activating the access to the plurality of fill buffers in response to a determination that there is a cache memory miss of the data cache memory.

15. The method of claim 12, and wherein the data array is partitioned into two or more groups, and wherein facilitating access to only part of the plurality of ways of the data cache memory comprises allowing access to only one of the two or more groups of the data array.

16. The method of claim 12, wherein facilitating access to only part of the plurality of ways of the data cache memory comprises:
facilitating access to only part of the plurality of ways of the data cache memory based at least in part on an address bit of the virtual address.

* * * * *